United States Patent [19]

Loggers

[11] Patent Number: 4,780,144

[45] Date of Patent: Oct. 25, 1988

[54] METHOD FOR PRODUCING A BUILDING ELEMENT FROM A FLY ASH COMPRISING MATERIAL AND BUILDING ELEMENT FORMED

[75] Inventor: Hendrik Loggers, Amerongen, Netherlands

[73] Assignee: Aardelite Holding B.V., Nunspeet, Netherlands

[21] Appl. No.: 928,254

[22] Filed: Nov. 7, 1986

[30] Foreign Application Priority Data

Nov. 13, 1985 [NL] Netherlands ............ 8503127

[51] Int. Cl.$^4$ ................................. C04B 7/34
[52] U.S. Cl. ................... 106/118; 106/120; 106/DIG. 1
[58] Field of Search ................ 106/118, 120, DIG. 1

[56] References Cited

U.S. PATENT DOCUMENTS

| | | | |
|---|---|---|---|
| 2,564,690 | 8/1951 | Havelin et al. | 106/120 |
| 3,192,060 | 6/1965 | Tilsen | 106/118 |
| 3,852,084 | 12/1974 | Webster et al. | 106/118 |
| 4,054,463 | 10/1977 | Lin | 106/109 |
| 4,105,463 | 8/1978 | Angelbeck | 106/118 |
| 4,490,178 | 12/1984 | Loggers et al. | 106/118 |

FOREIGN PATENT DOCUMENTS

| | | | |
|---|---|---|---|
| 56-73658 | 6/1981 | Japan | 106/118 |
| 2159143 | 11/1985 | United Kingdom | 106/120 |
| 1020403 | 5/1983 | U.S.S.R. | 106/DIG. 1 |

*Primary Examiner*—Steven Capella
*Attorney, Agent, or Firm*—Edmund M. Jaskiewicz

[57] ABSTRACT

A method is described for producing a building element in which a hardenable binder-material is mixed with a coarse particles comprising material after which the mixture is used for forming unhardened building elements. The building elements are subsequently hardened at a temperature up to 100° C. and at atmospheric pressure in a water-vapor containing atmosphere. The hardenable binder material is constituted by a separately prepared mixture of fly ash; Ca(OH)$_2$ or a substance which may be converted into Ca(OH)$_2$, and water.

Optionally the hardenable mixture may be partially granulated before use.

13 Claims, No Drawings

METHOD FOR PRODUCING A BUILDING ELEMENT FROM A FLY ASH COMPRISING MATERIAL AND BUILDING ELEMENT FORMED

BACKGROUND OF THE INVENTION

1. Field of the invention

The invention relates to a method for producing a buidling element by forming a mixture of fly ash, slaked lime, water and a coarse particles comprising material into an unhardened building element and by hardening said unhardened building element at elevated temperature and in a water vapor containing atmosphere.

2. Review of prior art

Such a method is known from the published German patent application DE-A-No. 3 321 899.

In said application a method is described in which crushed bottomslag of a coal fired powerstation, fly ash, slaked line and water are mixed; the mixture is formed into brick-form elements after which the bricks are hardened with use of steampressure at elevated temperature. Hardening preferably is carried out at a pressure of 14–16 bar and a temperature of 180°–220° C.

This known method has the disadvantage that for the hardening process a high temperature and high vapour pressure are necessary while the use of coarse particles comprising materials is restricted to crushed bottomslag.

SUMMARY OF THE INVENTION

The present invention has as a goal to provide a method of the indicated type which allows a hardening procedure at milder conditions and in which there is a broader choice of usable coarse particles comprising materials.

Said goals are attained with the method according to the invention which is characterised in that firstly a hardenable mixture at least comprising fly ash, $Ca(OH)_2$ or a substance which can be converted into $Ca(OH)_2$, and water is formed which mixture optionally is granulated partially and that subsequently said hardenable mixture is mixed with the coarse particles comprising material while hardening of the element is carried out at a temperature of maximum 100° C. and at atmospheric pressure.

Upon carrying out the method according to the invention a broad choice may be made out of possible coarse particles comprising materials.

The choice in particular may be made from
(a) materials which are conventional in the building elements producing industry
(b) said hardenable mixture comprising fly ash, $Ca(OH)_2$ or a substance which may be converted into $Ca(OH)_2$, and water in granulated condition or
(c) mixtures of one or more conventional materials and the mixture comprising fly ash, $Ca(OH)_2$ or a substance which may be converted into $Ca(OH)_2$, and water in granulated condition.

It has been found that by firstly forming a hardenable mixture from fly ash, $Ca(OH)_2$ or a substance which may converted into $Ca(OH)_2$, and water and subsequently mixing said mixture with a suitable coarse particles comprising material, building elements are obtained which may be hardened at relatively low temperature and at atmospheric pressure.

Said fly ash containing mixture, which serves as a binder forming a matrix for the coarse particles may optionally be granulated; by granulation the matrix characteristic of the fly ash mixture, is not influenced.

In the examples given hereinafter a variety of favourable embodiments of the method according the invention will be illustrated.

In particular, the coarse particles from the coarse particles comprising material may at least partially be formed by a mixture comprising fly ash, $Ca(OH)_2$ or a substance which may be converted into $Ca(OH)_2$, and water in granulaated condition. Where in the foregoing is indicated that the coarse particles comprising material may be chosen from materials which are conventional in the building elements producing industry, it is to be noted that a list comprising such materials is to be found in: Chemical Engineers Handbook 3 rd edition page 457 ff Mc.Graw Hill 1950; the materials which may be used is however not restricted to the coarse materials in said list.

By choosing the coarse particles as indicated materials having very good properties such as strength, volume weight and moisture take-up may be formed.

DETAILED DESCRIPTION OF THE INVENTION

In the method according to the invention, after mixing with water, possibly slaked lime and other substances, first coal ash is fully or partially formed into particles, whereupon the material is mixed with coarse material and formed into building material. Such forming may take place under the influence of vibration, shocking, pressing or extruding. Prior granulating results in forms being filled rapidly and properly, thus ensuring after compaction a building material with dimensional stability.

The possiblity of compacting under the influence of vibration implies that the building material can also be produced on concrete presses. Concrete presses are relatively inexpensive, and have a high production capacity. Prior granulation also affords pouring material into moulds.

The granular material, which can be obtained by subjecting material to a rolling movement or by subjecting material to a compacting pressure or an extrusion pressure, may contain, in addition to ash and water, slaked lime and other substances. The partially granular material can be compressed in a mould alone or mixed with another coarse substance, for instance cement or other substances. Granules for example can also be mixed with a mixture of ash, water and slaked lime. It is also possible to mix with gravel, crushed rock, waste material generated by a blast furnace plant, such as finely divided oxysludge, granulated slags, gypsum, calcium sulphate, finely divided haematite, and similar substances in conjunction with a substance having the function of a cementing substance. Such substances can also be included in the granular material.

Interesting is the processing of ash containing unslaked lime in addition to calcium sulphate. Such ashes result from a special method of waste-gas purification. Although fly ashes can often be used in conjunction with cements, these kinds of ashes are not to be recommended for use in combination with cement. The sulfate-containing ashes can be worked up in cement-free building materials which can be produced according to the invention. The presence of unslaked lime in the ash is an economic advantage.

Partial preforming particles from fly ash affords producing in a factory building materials which are practically fully composed of fly ash. If building material is made form granular material, it is possible that after hardening the strength reaches a value of approx. 15 N/mm$^2$ at a weight by volume of 1.60 kilograms per liter. The composition of the building material is 94% ash by weight and 6% slaked lime by weight. The strength can be increased by using a mixture of fly ash, water and slaked lime in combination with granular material. By adding other components it is possible to further increase the strength. Lower weights by volume are possible if only granular material is compacted at a low compression energy.

Preliminary ash granulation makes it possible to convert ash into sand-lime brick while preserving the characteristic sand-lime brick colour. This colour is whitish, and would change, in the event of ash being used in the mixture, even if just adding ten per cent, into a grey colour, which possibility is ruled from a sales perspective. To this end, it is not absolutely necessary that the particles be formed from a mixture containing slaked lime; the particles can be foremd from ash and water. The same principle of ash processing can also be applied in other mixtures from which building material are to be formed. For instance, the particles can be included in a concrete mixture or in a mixture of sand, cement and water. After forming the building element, such building element may have the shape of a brick, block, wall or floor section or a column. After compacting the particles will not necessarily have the same shape as directly after granulating. Hardening of the building material can be achieved by storing it at a normal temperature or by heat treatment under humid conditions, as is customary in quick setting of concrete or under moist conditions in a steam pressure vessel. The best method of hardening for the building material is for the hardening to proceed in a kind of steam chamber under atmospheric pressure, in which case the temperature is to be chosen above seventy degrees centigrade. Some explanatory examples.

EXAMPLE 1

An ash containing unslaked lime and calcium sulphate, for instance 10% salcium sulphate by weight and 10% calcium oxide by weight, is mixed with water in a ratio of 1:1. The water reacts with the calcium oxide while forming calcium hydroxide and steam which partly leaves the reaction vessel. The increased temperature causes the reaction to proceed within 10 minutes and affords the ash to be formed at least partially into particles in a granulator. Thereupon, the granular material is brought into a press where the mass is given the shape of the building material. Subsequently, the building material is placed into a chamber at a temperature of 95° C. for approx. 8 hours. After hardening, the building material will have its proper strength. The weight by volume is approximately 1.5 kg per liter.

EXAMPLE 2

An ash containing very little unbound calcium oxide by itself is mixed with 3% lime by weight and water. In the mixer, the temperature is raised to over 90° C. After 10 minutes, at this temperature, the lime has been completely converted into slaked lime, and granulation can start. A part, for instance half of the mixture, is not granulated, but is mixed with the granular material, whereupon the building material is formed. The building material here formed has a higher density and is stronger than the material obtained in example 1. The mould also is properly filled up as a result of the presence of particles.

EXAMPLE 3

A granular material is formed from a mixture of fly ash, bottom ash, granulated blast furnace slag, oxy sludge, and water. Granulation takes place, the building material is formed and hardened. The strength obtained is sufficiently high for the product so obtained to be used as building material.

EXAMPLE 4

A mixture of fly ash, slaked lime and water are mixed with a hardened granulate consisting of fly ash and a binder, obtained according a method described in Netherlands patent application No. 80 022 52.

The water containing mixture comprises granulated particles which have a larger size than the conventional fly ash particles. In the mixture the content of fly ash mixture varies between 24 and 26 weight % as may appear from the following table:

TABLE 1

| Hard granules wt. % | Fly ash mixture wt. % | Volume weight kg/l. | Strength N/mm$^2$ | Moisture absorption vol. % |
| --- | --- | --- | --- | --- |
| 75.6 | 24.4 | 1.47 | 13.8 | 30 |
| 50.8 | 49.2 | 1.54 | 22.1 | 22.1 |
| 38.3 | 61.7 | 1.34 | 23.6 | 26.4 |

It may be observed that the volumetric moisture absorption in these results is within the range as required for building blocks in the USA whereas also the strength is sufficiently high. It is also important that the volume-weight is approximately 1,5 kg/liter which means that the building blocks obtained are comparable to light weight concrete blocks when they are produced starting from hardened granules and fly ash mixture.

Also the application of not-hardened granules results in a building material which meets the requirements for light weight concrete.

The use of a binder, comprising a moist mixture of fly ash, slaked lime and water and optionally other components in which agglomerates are present also provides very good results in the forming of building material when additionally other coarse materials are added. It is established that the hardened granules or the not hardened granules may be replaced in the mixtures by bottom slag. Bottom slag is an ash residue which is found at the bottom of the furnace of a power station. This slag may be considered as agglomerate of sintered ash particles and has a very low bulk density of approximately of 0,4 kg/liter and is capable of absorbing a very large amount of water, up to 47 wt.% based on dry material.

EXAMPLE 5

Vasil ® grit, which is constituted by molten and glazed fly ash, which is used for sandblasting purposes, is mixed with a mixture of fly ash, slaked lime and water which was formed at elevated temperature.

Also in this case various ratios were used in which the percentage of coarse particles varies between 18 and 80 wt. %.

The strength for the test bricks obtained with use of this mixture is between 12 and 28 N/mm$^2$, depending on the composition.

The hardening is carried out at a temperature up to 98° C. in a water vapour containing atmosphere.

As the molten fly ash is of higher density than the fly ash granules, the volume weights obtained are higher and do vary more than in example 4, i.e. from 1,83 kg/.liter to 1,5 kg/liter. The moisture absorption is lower than for the elements obtained according example 4.

EXAMPLE 6

As a coarse aggregate now the bottom slag from the furnace of a power station is used; the possiblity was already indicated in the foregoing example. The volume weight decreases when the coarse aggregate in the mixture of fly ash, slaked lime and water contains a relative large amount of coarse particles. When the bottom slag is firstly reduced in size, the volume weight of the test bricks increases and even reaches a higher value in comparison to the values obtained upon application of hardened or not-hardened granulate which comprises fly ash.

TABLE II

| Bottomslag wt. % | Fly ash mixture wt. % | Volume weight kg/l. | Strength N/mm$^2$ | Moisture absorption vol. % |
|---|---|---|---|---|
| 20 | 80 | 1.49 | 28 | 23 |
| 30 | 70 | 1.47 | 25 | 26 |
| 40 | 60 | 1.42 | 20,8 | 29 |
| 50 | 50 | 1.38 | 18 | 32 |

Interesting results are also obtained when in the mixture of fly ash and binder, which is obtained in a moist condition from a mixer present in the factory, the portion of agglomerates is decreased to only a few percents by use of a fast rotating reducing device. Such a mixture then comprises only very few agglomerates, the largest diameter of the agglomerated fly ash particles being 1 mm approximately; the results were substantially identical to those given in the foregoing table.

As coarse particles also a sintered fly ash material for application in combination with a mixture comprising fly ash and slaked lime was investigated. Such an investigation is of great importance while sintering of fly ash particles also provides a concrete aggregate which may replace gravel. As binder one may consider not-hardened, very little binder comprising granulate from fly ash and water or not-hardened granulate comprising fly ash, $Ca(OH)_2$ or a substance which can be converted to $Ca(OH)_2$, and water according to the invention.

If a mixture of not-hardened granulate is mixed with sintered fly ash spheres, after compacting in a mould a unhardened building-brick, building-block or building element is obtained in which hardenable matter is present around the hard sintered fly ash particles, which hardenable matter may be hardened in a heat treatment and by which the building material obtains the desired strength.

If the sintered fly ash granulate, which functions in the combination as a coarse aggregate, is incorporated in a mxiture of fly ash, binder and optinally also other materials, which only is granulated partially, after forming and hardening an identically suitable material is obtained.

The great technical advantage of this combination possibility is that in the installation producing the granules from fly ash, the latter optionally provided with extra carbon in order to reach the correct temperature upon sintering, spherules are formed which may be incorporated in a compactable mixture comprising fly ash and at least a binder. At the same time energy of the sintering installation may be used for hardening the binder comprising products. Also mixing of hot sintered spherules and hardenable binder containing fly ash products is successfully carried out.

It will be understood that eventually obtained misfirings, which are formed in the fly ash-sinterings installation in the form of a sintered mass, also may be used as a coarse aggregate after reducing the mass.

EXAMPLE 7

Sintered fly ash spherules, as described in the preceding example, are incorporated as a coarse aggregate in combination with a mixture at least comprising fly ash, binder and water.

TABLE III

| Sintered fly ash spherules wt. % | Fly ash mixture wt. % | Volume weight kg/l. | Strength N/mm$^2$ | Moisture absorption vol. % |
|---|---|---|---|---|
| 20 | 80 | 1.60 | 31,0 | 25 |
| 33 | 67 | 1.59 | 30,8 | 26 |
| 55 | 45 | 1.56 | 24,0 | 26,3 |
| 65 | 35 | 1.47 | 20,3 | 29 |

Instead of the mixture subsequently unhardened granulate was used having a proportion of ungranulated mixture. The mixing ratio of sintered spherules and partially granulated mixture was 50/50. It appears that after compacting the function of the mixture, the complete enveloping of hard, coarse particles, is completely taken over by the partially granulated mixture.

The strength, volume weight and moisture absorption are completely corresponding to the values which may be seen from the table III given above.

EXAMPLE 8

As a coarse aggregate also commerically available sintered product of clay was used.

For the preparation of this lightweight aggregate also other raw materials may be used. In the USA for instance pitstone, slate and the like are used. The products are marketed under various tradenames. In these days these granules are also very often used as a replacement of gravel in flowerpots.

The results are shown in the following table:

TABLE IV

| Sintered clay product wt. % | Fly ash mixture wt. % | Volume weight kg/l. | Strength N/mm$^2$ | Moisture absorption vol. % |
|---|---|---|---|---|
| 23 | 77 | 1,53 | 24,0 | 28 |
| 35 | 65 | 1,52 | 18,5 | 30 |
| 50 | 50 | 1,51 | 16,5 | 33 |

Also very light coarse aggregates were tested in combination with a mortar from fly ash and ginder, i.e. vermiculite and polystyrene spheres.

A disadvantage is that relatively low strengths were obtained and that specially upon use of vermiculite the volume weight did not reproduce too well. The mass collapses at increasing compacting energy.

Polystyrene is in that respect better; the results are illustrated in tables in the following examples.

EXAMPLE 9
TABLE V

| Vermiculite wt. % | Fly ash mixture wt. % | Volume weight kg/l. | Strength N/mm² | Moisture absorption vol. % |
|---|---|---|---|---|
| 5 | 95 | 1,2 | 14,0 | 32 |

EXAMPLE 10
TABLE VI

| Polystyrene wt. % | Fly ash mixture wt. % | Volume weight kg/l. | Strength N/mm² | Moisture absorption vol. % |
|---|---|---|---|---|
| 3 | 97 | 1,2 | 13,0 | 18 |

Better results are obtained with use of natural products as bims and the somewhat heavier product lava, as is explained in the following example.

EXAMPLE 11
TABLE VII

| | Fly ash mixture wt. % | Volume weight kg/l. | Strength N/mm² | Moisture absorption vol. % |
|---|---|---|---|---|
| Lava wt. % | | | | |
| 50 | 50 | 1,53 | 24,0 | 27,8 |
| Bims wt. % | | | | |
| 50 | 50 | 1,49 | 20,4 | 28,3 |

Also an other synthetic light aggregate was combined; i.e. aerated concrete. Aerated concrete is a product obtained by allowing to expand a mixture of ground sand, slaked lime and some cement by means of gas which is generated in the moist mass upon mixing with water. After the cake is expanded, it is hardened at elevated temperature in a pressure vessel.

By breaking aerated concrete lightweight concrete aggregate is obtained which may be incorporated in the fly ash mixture.

The aerated concrete type used was of a class having a strength of approximately 0,3 N/mm² and a bulk density of approximately 0,45 kg/liter.

EXAMPLE 12
TABLE VIII

| Aerated concrete particles wt. % | Fly ash mixture wt. % | Volume weight kg/l. | Strength N/mm² | Moisture absorption vol. % |
|---|---|---|---|---|
| 30 | 70 | 0,98 | 10,0 | 25 |

EXAMPLE 13

In this example as the coarse aggregate a light-weight granule produced from fly ash is applied.

TABLE IX

| Light aggregate granules of fly ash wt. % | Fly ash mixture wt. % | Volume weight kg/l. | Strength N/mm² | Moisture absorption vol. % |
|---|---|---|---|---|
| 40 | 60 | 1,3 | 11,0 | 30 |

Also sand, gravel and broken rock may be used as coarse aggregate. Sand is a material comprising in addition to fine particles also particles which are more coarse than the particles occurring in fly ash, up to 5,6 mm. Upon application of the method according the invention however one has to be careful in using sand-mixtures while at certain mixing ratios mixtures are formed which are very voluminous resulting in size-variations in the building material after compacting. Elements are formed in that case in which the degree of compacting is not uniform. A ratio which may be applied is 50 weight % sand, in the case fine sand is used. If the sand comprises a large quantity of coarse particles, the quantity of sand may amount up to 40%. In the following example this is illustrated.

EXAMPLE 14
TABLE X

| Gravel-like sand wt. % | Fly ash mixture wt. % | Volume weight kg/l. | Strength N/mm² | Moisture absorption vol. % |
|---|---|---|---|---|
| 40 | 60 | 1,75 | 24,0 | 23 |

Upon use of gravel, the execution of the method is more easy; i.e. it is possible to vary within broader limits as shown in the following example.

EXAMPLE 15
TABLE XI

| Gravel wt. % | Fly ash mixture wt. % | Volume weight kg/l. | Strength N/mm² | Moisture absorption vol. % |
|---|---|---|---|---|
| 30 | 70 | 1,8 | 21,0 | 20 |
| 50 | 50 | 2,0 | 18,0 | 12 |
| 60 | 40 | 2,0 | 17,0 | 11,8 |

It is to be noted that the binder content in above given table has been relatively low.

This binder content may be taken even lower if ground gravel or ground rock is used as the coarse aggregate. By grinding rocktype material mixtures are obtained which may be compacted to high density.

This is illustrated in the following example.

EXAMPLE 16

Ground or broken rock is sieved over a sieve having round openings of 5,6 mm.

TABLE XII

| Broken rock wt. % | Fly ash mixture wt. % | Volume weight kg/l. | Strength N/mm² | Moisture absorption vol. % |
|---|---|---|---|---|
| 0 | 100 | 1,52 | 20,2 | 27,6 |
| 5 | 95 | 1,53 | 20,2 | 27,6 |
| 10 | 90 | 1,56 | 20,2 | 27,3 |
| 30 | 70 | 1,61 | 18,0 | 27,0 |
| 50 | 50 | 1,73 | 16,9 | 23,0 |
| 60 | 40 | 1,78 | 16,9 | 21,0 |

EXAMPLE 17

In a test concrete was broken into coarse particles and a part of said particles was milled in order to reduce the average size to below 300 μm. Concrete which is milled to such a small diameter appears to comprise, in free condition, a considerable amount of unreacted Ca-(OH)$_2$. When said milled concrete of small particle size is mixed with fly ash and water a hardenable mixture is obtained which may serve as a matrix forming substance for coarse particles. The hardenable mixture so obtained is mixed with the remaining coarse concrete particles; from the mass thus obtained unhardened building elements were formed. After hardening the building elements showed to have properties which correspond well to the properties obtained in the experiments of example 11, table VII.

EXAMPLE 18

The experiments of the foregoing example were repeated; instead of concrete now broken brick was used. When milled the fine brick particles show pozzolanic action. The hardened elements had properties of the same order as in example 11, table VII.

From the foregoing it appears that the binding of both not hardened granulate obtained from a fly ash comprising mixture and hard coarse material is very well possible with use of a mixture comprising fly ash, limetype binder and water and optionally also other materials; the fly ash mixture optionally may be partially granulated.

What is claimed is:

1. Method for producing a building element by forming a mixture of fly ash, slaked lime, water and a coarse particles comprising material into an unhardened building element and by hardening said unhardened building element at elevated temperature and in a water vapor containing atmosphere comprising the steps of forming a hardenable mixture at least comprising fly ash, $Ca(OH)_2$ or a substance which may be converted into $Ca(OH)_2$, and water, granulating at least partially the hardenable mixture, subsequently mixing said hardenable mixture with a suitable coarse particles comprising material, and hardening the resulting mixture of the hardenable material and coarse particles comprising material at a temperature of maximum 100° C. and at atmospheric pressure to produce the building element.

2. Method according to claim 1 in which the coarse particles comprising material is chosen from:
   (a) materials which are conventional in the building elements producing industry
   (b) said hardenable mixture comprising fly ash, $Ca(OH)_2$ or a substance which may be converted into $Ca(OH)_2$, and water in granulated condition or
   (c) mixtures of conventional material and the mixture comprising fly ash, $Ca(OH)_2$ or a substance which may be converted into $Ca(OH)_2$, and water in granulated condition.

3. Method according to claim 2 in which a mixture comprising fly ash, $Ca(OH)_2$ or a substance which may be converted into $Ca(OH)_2$, and water in granulated condition and which forms at least part of the coarse particles comprising material is hardened prior to its processing into an unhardened building element.

4. Method according to claim 1 in which a fly ash is used whichccontains free CaO per se and that said fly ash is optionally mixed with fly ash having a different CaO content in order to obtain a desired average CaO content.

5. Method according to claim 4 in which a fly ash is used which also contains $CaSO_4$.

6. Method according to claim 1 in which the amount of $Ca(OH)_2$ or substance which may be converted into $Ca(OH)_2$ which is present in the hardenable mixture amounts to approximately 25 wt. % based on the total amount of fly ash and $Ca(OH)_2$ or substance which may be converted into $Ca(OH)_2$.

7. Method according to claim 1 in which during formation of the hardenable mixture at least comprising fly ash, $Ca(OH)_2$ or a substance which may be converted into $Ca(OH)_2$, and water the temperature is raised to over 90° C. and that after reaching said temperature the mixing is continued for at least 1 minute.

8. Method according to claim 1 in which the weight ratio between the amount of coarse particles comprising material and the remaining quantity of the mixture of which a building element is formed is comprised between 100:1 and 1:100.

9. Method according to claim 2 in which the hardenable mixture which at least comprises fly ash, $Ca(OH)_2$ or a substance which may be converted into $Ca(OH)_2$, and water is partially replaced by raw materials which are conventional in the sand-lime brick industry such as slaked-lime and sand, the latter optionally being mixed with quartz flour, and the coarse particles comprising material is constituted by a mixture of fly ash, $Ca(OH)_2$ or a substance which may be converted into $Ca(OH)_2$, and water in granulated form.

10. Method according to claim 9 in which the granulated fly ash comprising mixture is hardened prior to its use.

11. Method according to claim 2 in which the hardenable mixture comprising at least fly ash, $Ca(OH)_2$ or a substance which may be converted into $Ca(OH)_2$, and water is partially replaced by a mortar known per se in the concrete industry and the coarse particles comprising material is constituted by a mixture of fly ash, $Ca(OH)_2$ or a substance which may be converted in $Ca(OH)_2$, and water in granulated condition.

12. Method according to claim 11 in which the granulated fly ash comprising mixture is hardened prior to its use.

13. Method according to claim 1 in which the building element is formed into a format which is substantially equal to the format of use after hardening and that the forming is carried out with use of devices which are conventional in the concrete-and/or sand-lime brick-industry.

* * * * *